United States Patent [19]
Hörth

[11] Patent Number: 5,972,090
[45] Date of Patent: Oct. 26, 1999

[54] STABILIZING FRICTION LEVELS

[75] Inventor: Franz-Josef Hörth, Limburg, Germany

[73] Assignee: Ferodo Bremsbelage Technik-Zentrum GmbH, Bad Camberg, Germany

[21] Appl. No.: 09/101,370

[22] PCT Filed: Jan. 15, 1997

[86] PCT No.: PCT/IB97/00146

§ 371 Date: Jul. 9, 1998

§ 102(e) Date: Jul. 9, 1998

[87] PCT Pub. No.: WO97/26465

PCT Pub. Date: Jul. 24, 1997

[30] Foreign Application Priority Data

Jan. 20, 1996 [GB] United Kingdom .................. 9601184

[51] Int. Cl.$^6$ ....................................................... C09K 3/14
[52] U.S. Cl. ................ 106/36; 106/600; 106/287.26; 427/421; 427/427; 427/428; 427/429; 427/430.1
[58] Field of Search ................... 106/36, 600, 287.26; 427/429, 421, 427, 428, 430.1

[56] References Cited

U.S. PATENT DOCUMENTS

| | | | |
|---|---|---|---|
| 5,433,774 | 7/1995 | Kapl et al. ................................. | 106/36 |
| 5,482,742 | 1/1996 | Takamiya et al. ....................... | 427/156 |

FOREIGN PATENT DOCUMENTS

| | | | |
|---|---|---|---|
| 105740 A2 | 4/1984 | European Pat. Off. ........ | F16D 69/02 |
| 2268982 | 11/1975 | France ............................. | F16C 33/10 |
| WO 92/05292 | 4/1992 | WIPO ............................. | C22C 1/09 |
| WO 95/15445 | 6/1995 | WIPO ............................. | F16D 65/10 |

OTHER PUBLICATIONS

Patent Abstracts of Japan, JP61106687 dated May 1986, entitled Frictional Material for Vehicle (Aisin Chem. Co. Ltd.) (2 pages).
Patent Abstracts of Japan, JP4151035 dated May 1992, entitled Frictional Member Pad (Sumitomo Electrical Ind. Ltd.) (1 page).
Patent Abstracts of Japan, JP4183774, dated Jun. 1992, entitled Friction Material (Toyota Motor Corp.) (2 pages).
Patent Abstracts of Japan, JP2008522 dated Jan. 1990, entitled Shim for Disc Brake (Akebono Brake Tes. & Dev. Centre Ltd.) (2 pages).
Patent Abstracts of Japan, JP60013875 dated Jan. 1985, entitled Surface–Treated Metallic Filler and Molding . . . (Matsushita Electric Works Ltd.) (1 page).
Derwent WPI, JP58077934 dated May 1983, entitled High Friction Material for Clutch Facings (Hitachi Chem. Co. Ltd.) (1 page).

*Primary Examiner*—Anthony Green
*Attorney, Agent, or Firm*—Synnestvedt & Lechner LLP

[57] ABSTRACT

A method of stabilizing the initial friction level of a brake friction material. The method comprises coating the friction material with a coating which is insoluble in water and which comprises a binder selected from alkali metal silicates and metal alkoxides. The coating may also comprise particulate friction-enhancing material.

8 Claims, 2 Drawing Sheets

STABILIZING FRICTION LEVELS

This invention is concerned with stabilising friction levels. The invention is applicable, inter alia, to brakes for automotive, railway or industrial applications. The invention is particularly applicable to brake pads or linings of the type which comprise particulate material bonded together by a cured binder, eg a phenolic resin.

In brakes, a friction material is pressed against a surface to create frictional forces. The size of the frictional forces depends on the pressure applied, and on characteristics of the friction material and of the surface engaged thereby. The relevant characteristics of the friction material are referred to herein as its "friction level". For example, the braking force available from a disc brake depends on the frictional level of the pads which are pressed against the disc.

In service, it is desirable that a brake friction material exhibits a stable friction level in order to achieve consistent braking forces. However, it is found that the friction level of a newly-installed friction material, herein referred to as the "green friction level", is often lower than the friction level achieved after a period in service, herein referred to as the "nominal friction level". The increase in the friction level in service is caused by "bedding in" increasing the operative surface area, and by heat generated during braking altering the structure of the friction material. This leads to inconsistent friction levels between installation and achievement of the nominal friction level, herein referred to as the "initial friction level" and inconsistent braking.

Many brake pads and linings are manufactured from a mixture of various friction-enhancing particles and uncured phenolic resin which is compressed, and subjected to heat to cure the phenolic resin. It is known to attempt to stabilise the initial friction level by coating a newly-manufactured brake pad or lining of this type with phenolic resin containing particulate alumina. The resin acts as a carrier for the alumina which acts to enhance the friction. This type of coating gives a temporary increase in the friction level until it wears away, thereby resulting in an improvement in stability. However, while this type of coating increases the green friction level, it is found in practice that the coating often wears away before the pad achieves its nominal friction level. This results in the friction level of the pad or lining falling from its green level before recovering to its nominal friction level. This results in a period during which the friction level is not stable. Furthermore, such coatings may smell or even burn.

It is an object of the present invention to provide an improved method of stabilising the initial friction level of a brake friction material.

The invention provides a method of stabilising the initial friction level of a brake friction material, characterised in that the method comprises coating the friction material with a coating which is insoluble in water and which comprises a binder selected from alkali metal silicates and metal alkoxides.

It is found that a method according to the invention enables the initial friction level to be stabilised to a greater extent. Furthermore, no smell or burning problem is experienced. It is also found that the coating seals the surface of the pad or lining reducing corrosion during storage.

The binder may be applied with a solvent, eg as an aqueous solution.

The coating may also comprise particulate friction-enhancing material which forms a slurry with the binder. The particulate friction-enhancing material is preferably inorganic to avoid fading of the friction level and must not react with the pad. Fine particles are preferred which may, for example, be selected from minerals, ceramics, certain metal oxides, carbides, metal phosphates, and silicates. Preferred materials are alumina, and silicon carbide. Preferably, the particulate friction-enhancing material comprises a mixture of two or more materials, in order to allow the green friction level and, if desired, the visual appearance of the coating to be adjusted by varying the quantity of and/or the proportions of the materials. For example, the green friction level can be adjusted to match the nominal friction level.

The binder may be a silicate or an alkoxide of a metal selected from the first to the fourth main groups of the periodic table. Preferred possibilities are sodium silicate and potassium silicate. Where the binder is an alkoxide, it may comprise alkoxy group selected from methyl-, ethyl-, propyl-, isopropyl-, and phenyl-.

The coating may also comprise a pigment to give the coating a distinctive colour or to match the colour of the pad or lining. Suitable pigments include black iron oxide, red iron oxide, and chrome oxide.

The coating may also comprise a surfactant to improve wetting of the friction material by the coating. Where more than one particulate material is used, a thickener may also be included in the coating to reduce separation of the particulate materials.

A coating according to the invention can be applied to the friction material by various methods, eg by brush, by roller, by spray, or by dipping. The consistency of the coating can be adjusted, eg by adding a thickener, to suit the application method. The coating can then be dried at room temperature or by the application of heat.

There now follows a detailed description, to be read with reference to the accompanying drawings, of a method which is illustrative of the invention.

In the illustrative method, a coating was prepared by forming a 30% aqueous solution of sodium silicate. To 20 parts by weight of this solution, the following was added:

2 parts by weight fine alumina particles, 2 parts by weight fine silicon carbide particles, and 3 parts by weight fine black iron oxide particles.

This resulted in a black slurry comprising the aqueous solution, particulate friction-enhancing materials, namely alumina and silicon carbide, and particulate pigment, namely the iron oxide. The equal proportions by weight of the alumina and silicon carbide were selected to give a green friction level substantially equal to the nominal friction level of the pad to which the coating is to be applied.

The slurry was applied by brush at about 0.016 gms per sq. cm (wet weight) to a disc brake pad of conventional formulation which is bound together by a cured phenolic resin. The coating was dried by the application of heat. This resulted in a pad having a coating thereon formed from sodium silicate with particles of friction-enhancing material dispersed therein. The coated pad was then tested as illustrated by FIG. 1.

Figure 1:
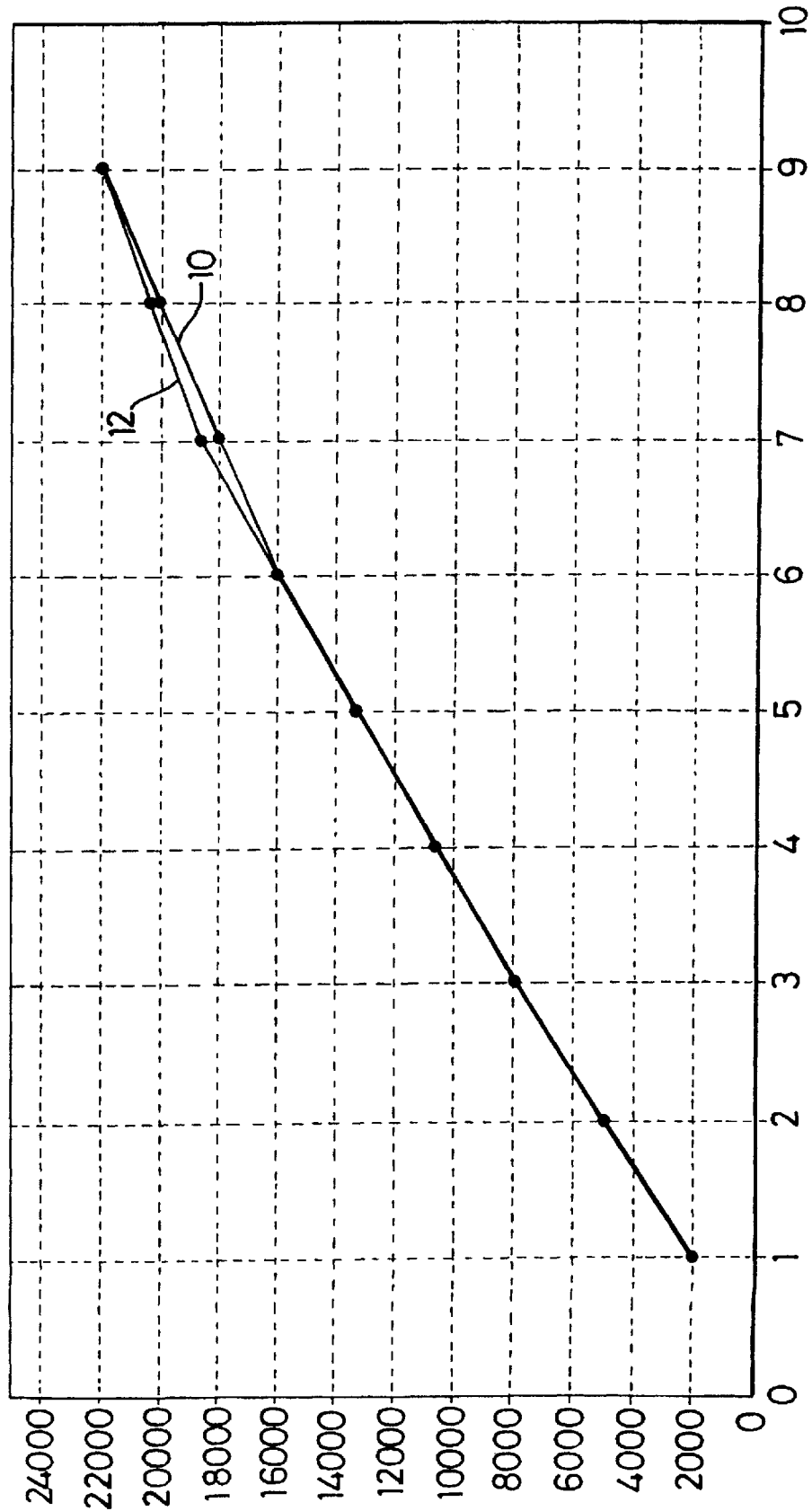
FIG. 1 is a graphical representation of the performance of a brake pad having a coating applied by the illustrative method, showing braking moment in Newton Meters (y axis) against braking pressure in Bar (x axis)

FIG. 1 shows a line 10 which represents the first performance of the newly-installed pad, ie with its coating intact and having the green friction level, and a line 12 which represents the performance of the pad after bedding-in, ie at nominal friction level. It is to be noted that the lines 10 and 12 lie on top of one another for much of the curves only parting slightly at pressures above 6 bar. This indicates that there was little variation in the friction level.

Figure 2:
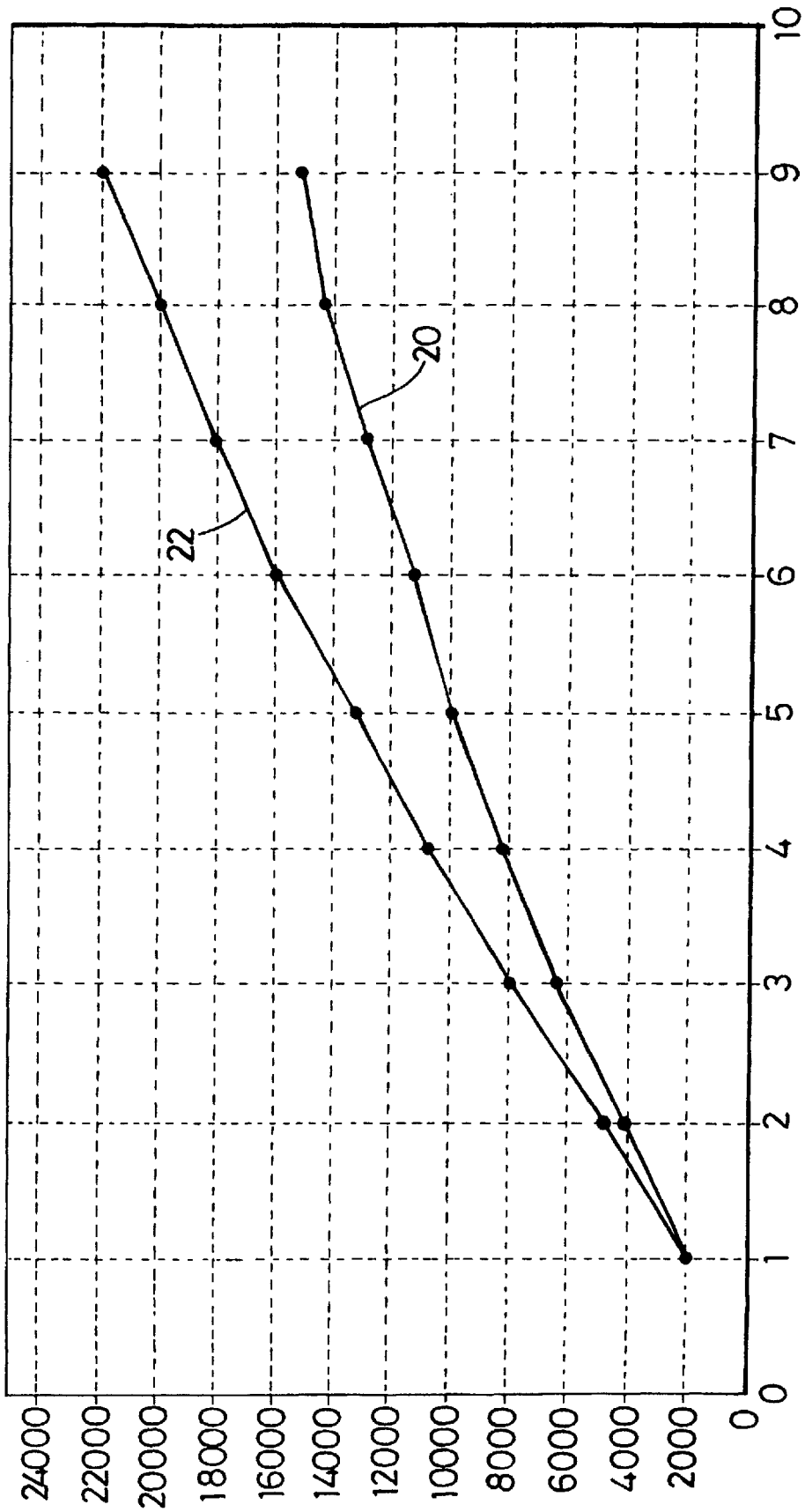
FIG. 2 is similar to FIG. 1 but shows the performance of a similar brake pad without a coating.

FIG. 2 shows a line 20 which represents the first performance of a pad similar to the pad of FIG. 1 but without a coating. FIG. 2 also shows a line 22 which represents the performance of the pad after bedding-in. It is to be noted that the lines 20 and 22 are spaced progressively further apart as the pressure increases. This indicates that there was a substantial variation in the friction level.

I claim:

1. A method of stabilising the initial friction level of a brake friction material, wherein the method comprises coating the friction material with a coating which is insoluble in water and which comprises a binder selected from the group consisting of alkali metal silicates and metal alkoxides, the coating also comprising particulate friction-enhancing material.

2. A method according to claim 1, wherein the coating is applied with a solvent.

3. A method according to claim 1, wherein the coating is applied as a slurry.

4. A coating according to claim 1, wherein the particulate friction-enhancing material comprises a mixture of two or more materials.

5. A method according to claim 1, wherein the friction-enhancing material comprises at least one of alumina, and silicon carbide.

6. A method according to claim 1, wherein the binder is sodium silicate or potassium silicate.

7. A method according to claim 1, wherein the metal alkoxide comprises a methoxide, ethoxide, propoxide, isopropoxide or phenoxide.

8. A method according to claim 1, wherein the coating also comprises a pigment.

* * * * *